US009052524B2

(12) United States Patent
Taniguchi et al.

(10) Patent No.: US 9,052,524 B2
(45) Date of Patent: Jun. 9, 2015

(54) ILLUMINATION DEVICE, PROJECTION TYPE IMAGE DISPLAY DEVICE, AND OPTICAL DEVICE

(75) Inventors: Yukio Taniguchi, Tokyo (JP); Makio Kurashige, Tokyo (JP); Yasuyuki Ooyagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/115,732

(22) PCT Filed: Apr. 23, 2012

(86) PCT No.: PCT/JP2012/060876
§ 371 (c)(1),
(2), (4) Date: Dec. 13, 2013

(87) PCT Pub. No.: WO2012/153627
PCT Pub. Date: Nov. 15, 2012

(65) Prior Publication Data
US 2015/0036108 A1 Feb. 5, 2015

(30) Foreign Application Priority Data

May 10, 2011 (JP) ................................. 2011-105457

(51) Int. Cl.
*G03B 21/14* (2006.01)
*G03H 1/02* (2006.01)
(Continued)

(52) U.S. Cl.
CPC .............. *G02B 27/48* (2013.01); *H04N 9/3129* (2013.01); *G02B 26/105* (2013.01); *G02B 26/12* (2013.01); *G02B 26/106* (2013.01); *H04N 9/3155* (2013.01); *H04N 9/3161* (2013.01)

(58) Field of Classification Search
USPC ................. 353/31, 34, 37, 82, 98; 359/223.1, 359/224.2, 226.2, 197.1, 201.2, 203.1, 359/205.1
See application file for complete search history.

(56) References Cited

U.S. PATENT DOCUMENTS 5,845,981 A * 12/1998 Bradley ........................... 353/31
6,540,362 B1 * 4/2003 Janssen ............................ 353/31
(Continued)

FOREIGN PATENT DOCUMENTS

CN 101203802 A 6/2008
CN 101276062 A 10/2008
(Continued)

OTHER PUBLICATIONS

Chinese Office Action dated Sep. 16, 2014 in the corresponding Chinese patent application No. 201280022254.2.
(Continued)

*Primary Examiner* — William C Dowling
(74) *Attorney, Agent, or Firm* — Kratz, Quintos & Hanson, LLP

(57) ABSTRACT

To provide an illumination device and a projection type image display device that illuminate an area to be illuminated (image formation area) under conditions where speckle noise is less noticeable.
An illumination device according to the present invention includes: a light source 11 that emits coherent light; an optical scanning section 15 that scans the coherent light emitted from the light source 11; and an optical path conversion system 21 configured to allow the coherent light scanned by the optical scanning section 15 to illuminate an area to be illuminated sequentially in an overlapping manner. An incident angle of the coherent light that enters respective points of the area to be illuminated changes with time.

7 Claims, 5 Drawing Sheets

(51) Int. Cl.
*G02B 27/48* (2006.01)
*H04N 9/31* (2006.01)
*G02B 26/10* (2006.01)
*G02B 26/12* (2006.01)

(56) References Cited

U.S. PATENT DOCUMENTS

| | | | |
|---|---|---|---|
| 2003/0142277 A1* | 7/2003 | Hatakeyama et al. | 353/31 |
| 2008/0247022 A1 | 10/2008 | Yamauchi | |
| 2009/0168424 A1 | 7/2009 | Yamauchi | |
| 2013/0169940 A1* | 7/2013 | Takanokura et al. | 353/31 |
| 2014/0092321 A1* | 4/2014 | Kurashige | 349/7 |
| 2014/0118702 A1* | 5/2014 | Taniguchi et al. | 353/38 |

FOREIGN PATENT DOCUMENTS

| | | | |
|---|---|---|---|
| EP | 1 967 303 A1 | 10/2008 | |
| JP | S61-212816 | 9/1986 | |
| JP | H6-208089 | 7/1994 | |
| JP | 2004-191839 A1 | 7/2004 | |
| JP | 2008-256824 A1 | 10/2008 | |
| JP | 2009-163901 A1 | 7/2009 | |

OTHER PUBLICATIONS

International Search Report for International Application No. PCT/JP2012/060876 dated Jun. 12, 2012.

Second Notice of Rejection issued by the Chinese Patent Office dated Mar. 17, 2015 in corresponding counterpart Chinese Patent Application No. 201280022254.2.

Extended European Search Report (eESR) dated Mar. 17, 2015 corresponding to counterpart European patent application No. 12782392.0.

* cited by examiner

ILLUMINATION DEVICE, PROJECTION TYPE IMAGE DISPLAY DEVICE, AND OPTICAL DEVICE

TECHNICAL FIELD

The present invention relates to an illumination device that uses coherent light such as laser light, a projection type image display device that uses the coherent light to illuminate an optical modulation element to project an image on a screen, and an optical device for use in the illumination device and projection type image display device.

BACKGROUND ART

There is known a projector (projection type image display device) that uses an optical modulation element (micro display) such as a liquid crystal or MEMS to visualize illumination light from a light source and projects an image based on the illumination light on a screen. Some of such projectors use, as its light source, a white light source such as a high-pressure mercury lamp and projects an image on a screen while magnifying an image obtained by illuminating a two-dimensional optical modulation element such as a liquid crystal by means of projection optical system.

However, a high-intensity discharge lamp such as the high-pressure mercury lamp has a comparatively short life, so that when the high-intensity discharge lamp is used for a projector, the lamp needs to be replaced frequently with new one. Moreover, the use of the high-intensity discharge lamp disadvantageously increases a size of the projector. Moreover, it is unfavorable to use the high-pressure mercury lamp that uses mercury, in terms of environmental burden. To solve such drawbacks, a projector that uses laser light as its light source is proposed. A semiconductor laser has a longer life than the high-pressure mercury lamp and allows size reduction of the entire projector.

The laser light thus expected to be used as a next-generation light source for projector is excellent in linearity, so that it is considered that light incidence efficiency can be enhanced more than an LED. However, in a case where the laser light is used as the light source, speckle noise may generate due to high coherence, disadvantageously making an image difficult to see.

The speckle noise is granular noise generated due to interference of scattering light from a minute irregularity of a surface to be irradiated when coherent laser light is used as a light source. The speckle noise generated in the projector not only causes degradation of image quality but also provides physiologic discomfort to a viewer. To reduce the speckle noise, various attempts, such as to vibrate a diffuser plate through which the laser light passes, to widen a wavelength spectrum of laser, and vibrate a screen itself which is an irradiation target of the laser light are made. As one of such attempts for speckle noise reduction, Patent Document 1 discloses a non-speckle display device that reduces the speckle noise by rotating a diffuser plate through which coherent light passes.

PRIOR ART DOCUMENT

Patent Document

Patent Document 1: JP06-208089A

SUMMARY OF THE INVENTION

Means for Solving the Problems

The speckle noise reduction method disclosed in Patent Document 1 can average speckle noise (interference pattern) generated before arrival at a diffusion element. However, since an angle of incident light from a diffusion center to the screen is invariant at any point on the screen, so that light scattering characteristics at respective points on the screen are constant, with the result that removal effect of the speckle noise generated on the screen can hardly be obtained.

Such speckle caused by the coherent light has become a problem not only in a projection type image display device (projector) that uses the coherent light as a light source, but also in various illumination devices that use the coherent light.

An object of the present invention is to provide an illumination device capable of suppressing speckle generated due to use of the coherent light as a light source and a projection type image display device using the illumination device. Another object of the present invention is to provide the illumination device and projection type image display device capable of effectively illuminating an area to be illuminated to enhance light utilization efficiency. A still another object of the present invention is to illuminate the entire area to be illuminated uniformly by illuminating the area to be illuminated under nearly the same conditions.

An illumination device according to the present invention includes: a light source that emits coherent light; an optical scanning section that scans the coherent light emitted from the light source; and an optical path conversion system configured to allow the coherent light scanned by the optical scanning section to illuminate an area to be illuminated sequentially in an overlapping manner. An incident angle of the coherent light that enters respective points of the area to be illuminated changes with time.

In the illumination device according to the present invention, the optical path conversion system illuminates the entire area to be illuminated regardless of a position at which the optical scanning section scans the coherent light.

In the illumination device according to the present invention, the optical path conversion system includes a first light collection element and a second light collection element, the optical scanning section is provided at an upstream side focal position of the first light collection element, an upstream side focal position of the second light collection element is provided at a downstream side focal position of the first light collection element, and the area to be illuminated is positioned at a downstream side focal position of the second light collection element.

In the illumination device according to the present invention, the optical scanning section includes a galvano mirror.

In the illumination device according to the present invention, the optical scanning section includes a polygon mirror.

In the illumination device according to the present invention, the optical scanning section includes a variable diffraction element.

In the illumination device according to the present invention, the optical scanning section includes a phase modulation element.

In the illumination device according to the present invention, a beam forming means is disposed between the light source and optical scanning section.

A projection type image display device according to the present invention includes: a light source that emits coherent light; an optical scanning section that scans the coherent light emitted from the light source; an optical modulation element having an image formation area in which an image is formed; an optical path conversion system configured to allow the coherent light scanned by the optical scanning section to illuminate the image formation area sequentially in an overlapping manner; and a projection optical system that projects the image of the optical modulation element on a screen. An incident angle of the coherent light that enters respective points of the image formation area changes with time.

An optical device according to the present invention includes: an optical scanning section that scans coherent light; and an optical path conversion system configured to allow the coherent light scanned by the optical scanning section to illuminate an area to be illuminated sequentially in an overlapping manner.

Advantages of the Invention

According to the illumination device of the present invention, the optical scanning section scans the coherent light to cause the illumination light to be emitted from the optical path conversion system to illuminate the area to be illuminated at an angle changing with time. This allows the speckle generated in the area to be illuminated to be made invisible to a viewer. Moreover, in the projection type image display device according to the present invention, the screen is also subjected to irradiation at an angle changing with time, thereby effectively suppressing the speckle to be generated on the screen.

MODE FOR CARRYING OUT THE INVENTION

Figure 1:
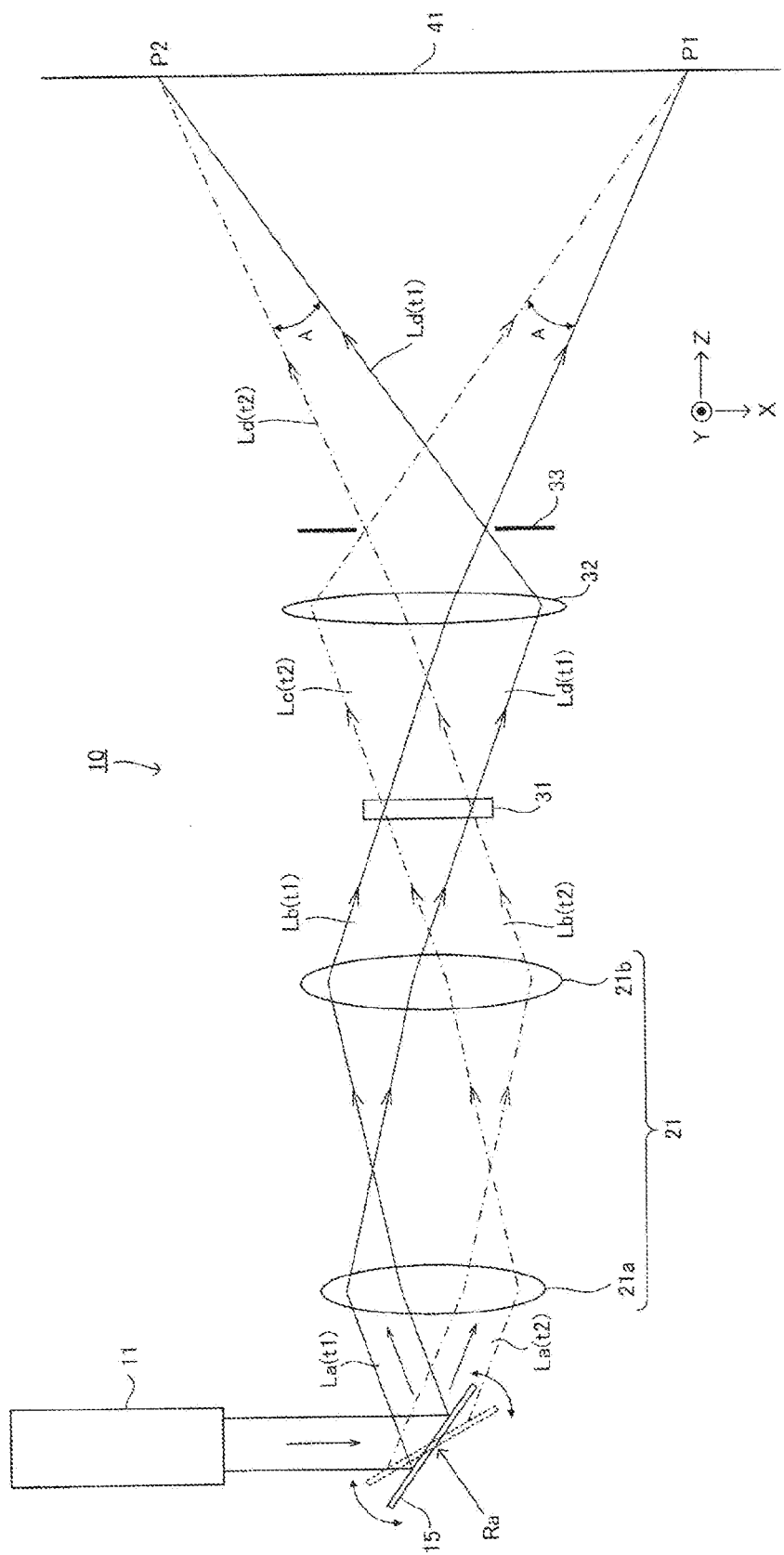
FIG. 1 is a view illustrating a configuration of a projection type image display device provided with an illumination device according to an embodiment of the present invention.

Now, an illumination device and a projection type image display device according to an embodiment of the present invention will be described with reference to the drawings. FIG. 1 is a view illustrating a configuration of a projection type image display device provided with an illumination device according to an embodiment of the present invention. It should be noted that drawings described hereinafter are each a schematic diagram, and may represent different shape, dimension, and position from those actually illustrated.

A projection type image display device 10 according to the present embodiment includes an illumination device 20, an optical modulation element 31 for forming an image, and a projection optical system 32 that projects an image formed by the optical modulation element 31 on a screen 41. In the drawings, a surface of the screen 41 on which an image is projected is assumed to be X-Y plane, and an axis normal to the X-Y plane is assumed to be a Z-axis. As the screen 41, a reflective screen for observing an image reflected by the screen 41 or a transmissive screen for observing an image transmitted through the screen 41 can be used.

The illumination device 20 of the present embodiment includes a light source 11, an optical scanning section 15, and an optical path conversion system 21. The optical device of the present invention is constituted by the optical scanning section 15 and optical path conversion system 21 of the illumination device 20 (constituent elements of the illumination device other than the light source 11).

As the light source 11, various types of laser systems, including a semiconductor laser system, that emit laser light as coherent light can be used. The coherent light emitted from the light source 11 illuminates the optical scanning section 15. It is preferable to provide a beam forming means for uniforming an intensity distribution of the coherent light emitted from the light source 11 in a cross-sectional direction thereof. For example, the beam forming means is provided so as to achieve the uniformization on a surface in the vicinity of the optical scanning section, and the optical path conversion system 21 is set such that the surface and optical modulation element surface are in a conjugate relationship, thereby allowing illumination of the area to be illuminated with a uniform intensity. The beam forming means may be configured not only to uniform the intensity but also to change a cross-sectional shape of laser beam into a shape of the optical modulation element. Moreover, a diameter of the coherent light to be emitted may be adjusted by a beam expander depending on various conditions such as a size of an image formation area of the optical modulation element 31 as the area to be illuminated or a magnification of the optical path conversion system 21.

The optical scanning section 15 is an optical element that changes with time a direction of the coherent light emitted from the light source 11. In the present embodiment, a galvano mirror that can rotate a reflecting surface about a rotation center Ra is used. As such a movable mirror device that mechanically rotates a movable mirror, a polygon mirror, or an MEMS scanner can also be used. In addition, there can be used a variable diffraction element that electrically changes a diffraction condition to change a light emitting direction or a phase modulation element. Unlike the movable mirror device, such elements do not include a movable portion, so that it is possible to reduce process burden at manufacturing time or maintenance time. Details of this will be described later.

The optical scanning section 15 of the present embodiment has a rotation center Ra in a Y-axis direction and performs one-dimensional scanning that scans the coherent light in an X-Z plane. However, the optical scanning section 15 may perform one-dimensional scanning or two-dimensional scanning for the coherent light. In each case, it is necessary for the optical scanning section 15 to scan an incident surface of the optical path conversion system 21 so as to consequently sufficiently illuminate the area to be illuminated.

The coherent light emitted from the light source 11 enters the optical scanning section 15. In the optical scanning section 15, the coherent light becomes scanning light La whose direction is changed with time and then enters the optical path conversion system 21. In the drawing, scanning light La (t1) and scanning light La (t2) around the outermost ends are illustrated. Actually, however, the scanning light La sequentially moves between the La (t1) and La (t2) in a continuous or intermittent manner.

The optical path conversion system 21 is an optical element that illuminates an image formation area as the area to be illuminated with the scanning light La emitted from the optical scanning section 15. The scanning light La scanned by the optical scanning section 15 passes through the optical path conversion system 21 to sequentially illuminate the area to be illuminated in an overlapping manner. Particularly, in the present embodiment, the optical path conversion system 21 always illuminate the entire image formation area of the optical modulation element 31 as the area to be illuminated regardless of a scanning position of the optical scanning section 15, thereby enhancing light utilization efficiency. Moreover, the optical path conversion system 21 always illuminates the image formation area with parallel light or substantially parallel light to thereby illuminate respective points of the image formation area under the same conditions. This, for example, allows uniform illumination of the entire image formation area.

The optical modulation element 31 is a display having the image formation area in which an image is formed based on an image signal. In the present embodiment, a transmissive liquid crystal element is used as the optical modulation element 31. In addition to such a transmissive type, a reflective type such as an MEMS can be used. Illumination light Lb from the optical path conversion system 21 enters the optical modulation element 31 while sequentially changing its incident angle and is then converted into modulated light Lc based on an image displayed in the image formation area.

The projection optical system 32 performs magnification conversion for the modulated light Lc to convert it into image reproduction light Ld for projection on the screen 41. In the present embodiment, a diaphragm 33 is provided at a downstream side of the projection optical system 32.

Figure 2:
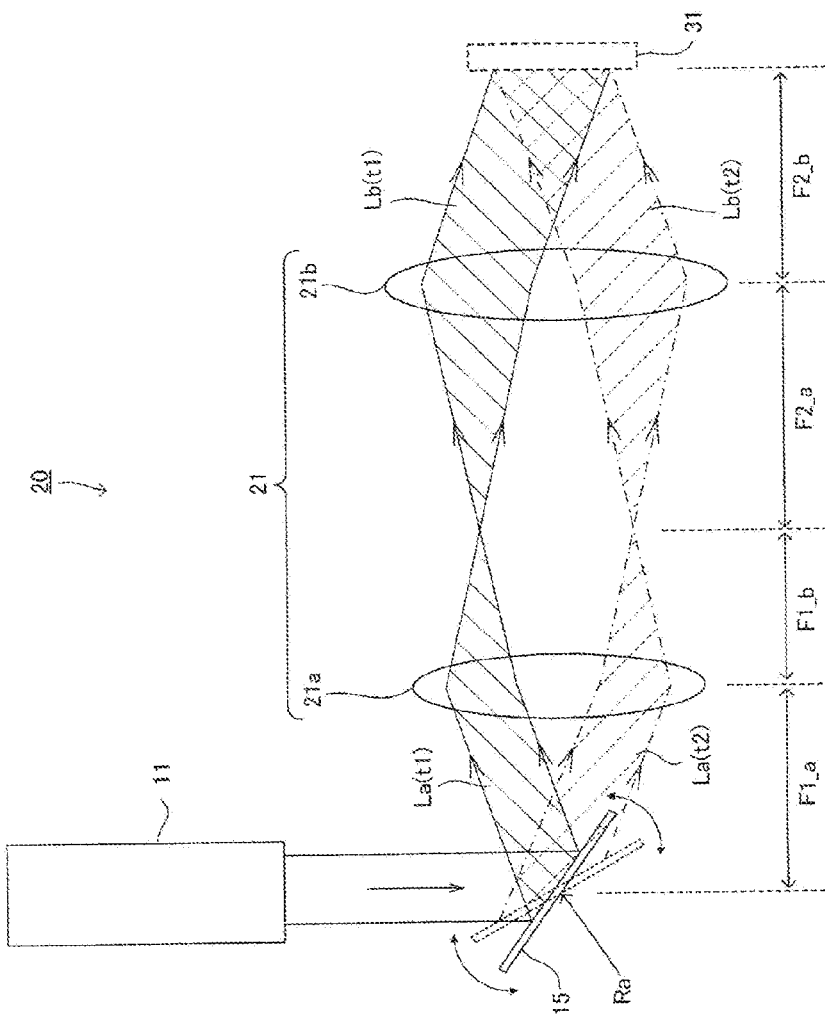
FIG. 2 is a view illustrating a configuration of the illumination device according to the embodiment of the present invention.

Now, an operation principle, etc., of the illumination device 20 functioning as a main factor for suppressing the speckle in the projection type image display device 10 will be described in detail. FIG. 2 is a view illustrating a configuration of the illumination device 20 according to the embodiment of the present invention, which shows a state of illumination by the optical path conversion system 21.

As illustrated in FIG. 2, the scanning light La (t1) at time t1 enters the optical path conversion system 21 and is then converted into illumination light Lb (t1) to illuminate at least a part of the image formation area of the optical modulation element 31. Similarly, the scanning light La (t2) at time t2 enters the optical path conversion system 21 and is then converted into illumination light Lb (t2) to illuminate at least a part of the image formation area. As illustrated, the illumination device 20 illuminates the entire image formation area while changing with time the incident angle with respect to the area to be illuminated.

The optical path conversion system 21 in the present embodiment includes a first light collection element 21a and a second light collection element 21b. As illustrated, an upstream side focal length of the first light collection element 21a is set to F1#a, and a downstream side focal length thereof is to F1#b, and the rotation center Ra of the optical scanning section 15 is situated at an upstream side focal position of the first light collection element 21a. On the other hand, an upstream side focal length of the second light collection element 21b is set to F2#a, and a downstream side focal length thereof is to F2#b, and an incident surface of the optical modulation element 31 is situated at a downstream side focal position of the second light collection element 21b. A downstream side focal position of the first light collection element 21a is situated at an upstream side focal position of the second light collection element 21b.

As the first and second light collection elements 21a and 21b, an element (e.g., lens or concave mirror) having a light collection function is used. Alternatively, a hologram element or a diffraction element having an equivalent function may be used. Further alternatively, a combination of the above elements may be used. The optical path conversion system 21 only needs to have a function of illuminating the area to be illuminated sequentially in an overlapping manner with the scanned coherent light. In addition to a combination of the light collection elements, a plurality of mirrors or prisms, a plurality of light guide elements, an optical fiber array, or the like may be used to realize the optical path conversion system 21.

With such optical arrangement of the first and second light collection elements 21a and 21b, the parallel or substantially parallel coherent light emitted from the light source 11 can always illuminate the entire predetermined area of the optical modulation element 31 in the form of the parallel or substantially parallel illumination light Lb. In the present embodiment, the predetermined area that the illumination light Lb illuminates is set as the image formation area of the optical modulation element 31. The entire image formation area is thus always illuminated to enhance light utilization efficiency. Moreover, the use of the parallel or substantially parallel illumination light Lb allows respective points of the image formation area to be illuminated under the same conditions.

Although the optical path conversion system 21 described above includes the first and second light collection elements 21a and 21b, the configuration of the optical path conversion system 21 is not limited to this, but any configuration may be adopted as long as at least a part of the image formation area as the area to be illuminated is illuminated with the scanning light La, and the entire image formation area is illuminated in a sequential manner in association with the light scanning performed by the optical scanning section 15.

Returning to FIG. 1, the modulated light Lc modulated by the optical modulation element 31 is magnified by the projection optical system 32 and projected on the screen 41 as the image reproduction light Ld, allowing a viewer to observe an image reflected from or transmitted through the screen 41. At this time, the coherent lights diffused on a surface of the screen 41 interfere with each other to cause speckle. However, in the present embodiment, the coherent light is scanned by the optical scanning section 15, which consequently sequentially changes an incident angle of the image reproduction light Ld to be projected on the screen 41. This extremely effectively makes the speckle less noticeable.

For example, the image reproduction light Ld (t1) at the time t1 and image reproduction light Ld (t2) at the time t2 enter a point P1 on the screen illustrated in FIG. 1 at different incident angles. The same can be said for a point P2 illustrated in FIG. 1 and other not illustrated points. That is, the image reproduction light Ld projects an image on the screen 41 while changing with time the incident angle. Therefore, in an extremely short time, the speckle formed on the screen is averaged in terms of time within a visual response time by the image reproduction light Ld which is irradiated at an incident angle changing with time and thereby becomes sufficiently less noticeable to the viewer viewing the image projected on the screen 41.

The speckle observed by the viewer includes not only the speckle thus generated due to scattering of the coherent light on the screen 41, but also speckle generated on various optical elements of the projection type image display device 10. Such speckle is observed by the viewer when being projected on the screen 41 through the optical modulation element 31. In the present embodiment, the scanning light La scans the optical path conversion system 21 to allow the speckle generated on the respective optical elements of the projection type image display device 10 to be made sufficiently less noticeable.

Figure 3:
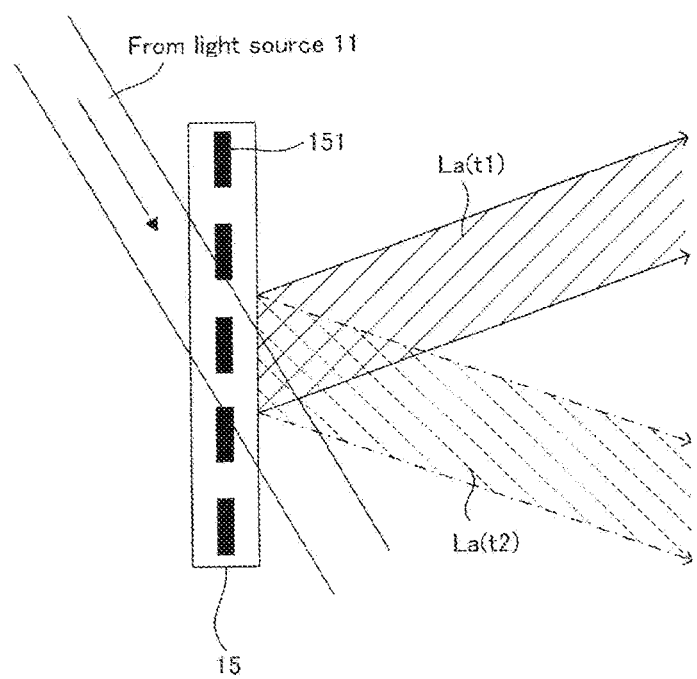
FIG. 3 is a view illustrating a configuration of the optical scanning section (variable diffraction element) according to another embodiment of the present invention.

The optical scanning section 15 constituted by the movable mirror device using the galvano mirror has thus been described with reference to FIGS. 1 and 2. As described above, the optical scanning section 15 may be realized using a variable diffraction element or a phase modulation element that does not include a movable portion. FIG. 3 is a view illustrating a configuration of the optical scanning section (variable diffraction element) according to another embodiment of the present invention, FIG. 4A is a view illustrating a configuration of the optical scanning section (phase modulation element) according to still another embodiment of the present invention, FIG. 4B is a view illustrating a phase change in the optical scanning section, and FIGS. 5A to 5E are views each illustrating the phase change in the optical scanning section (phase modulation element) according to another embodiment of the present invention.

The optical scanning section 15 of FIG. 3 is an embodiment using the variable diffraction element. In this embodiment, an amplitude modulation type liquid crystal element is used as the variable diffraction element. The liquid crystal element constituting the optical scanning section 15 forms a diffraction grating by liquid crystal 151. A pitch of the diffraction grating formed by the liquid crystal 151 is changed with time to change a diffraction angle, thereby allowing the emission direction of the coherent light emitted from the light source 11 and entering the optical scanning section 15 to be changed with time. In the present embodiment, the coherent light is made to obliquely enter an incident surface of the optical scanning section 15 to allow zero-dimensional light to escape and allow diffracted light to be emitted in a normal direction of the element.

As the variable diffraction element, in addition to the above liquid crystal element, an optical element, such as an acoustic-optical element, that modulates a phase of light passing there through may be used. Alternatively, a micromirror device that modulates a phase of light to be reflected thereby may be used.

Figure 4A:
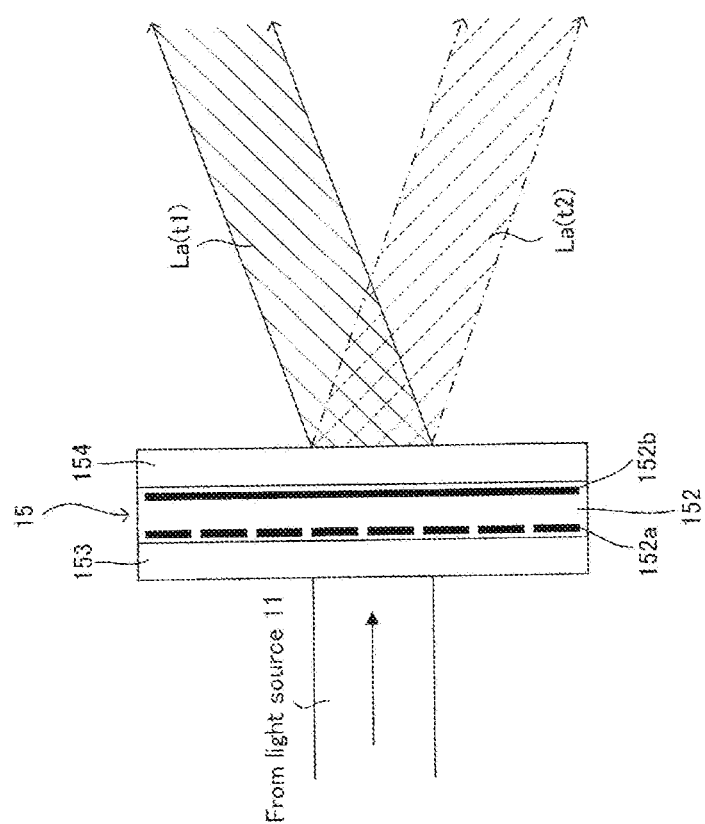
FIGS. 4A and 4B are views illustrating a configuration of the optical scanning section (phase modulation element) according to another embodiment of the present invention and a phase change in the optical scanning section, respectively.
Figure 4B:
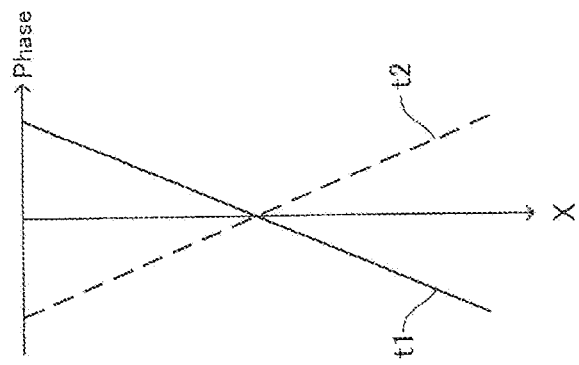

The light scanning section 15 of FIG. 4A is an embodiment using the phase modulation element. In this embodiment, a liquid crystal that modulates only a phase is used. As illustrated in FIG. 4A which is a configuration view of the light scanning section 15 using the phase modulation element, the optical scanning section 15 includes a liquid crystal layer 152 encapsulated between transparent base materials 153 and 154. The liquid crystal layer 152 includes pixel electrodes 152a provided sectionally and a common electrode 152b. By sequentially changing a refractive index section by section, the phase of transmitted light can be changed.

FIG. 4B is a view illustrating a basic form of a phase change and representing a phase distribution in correspondence with the configuration of FIG. 4A. By changing bias voltage to be applied to the pixel electrode 152a, a phase distribution as indicated by time t1 and time t2 can be formed. In such a phase distribution, as illustrated in FIG. 4A, the scanning light La, which is in a state of the scanning light La (t1) at the time t1, can be deflected into a state of the scanning light La (t2) at time t2. Actually, changing the phase state between the time t1 and time t2 in multiple stages or in a continuous manner allows a direction of the scanning light (La) to be changed in multiple stages or in a continuous manner.

Figure 5A:
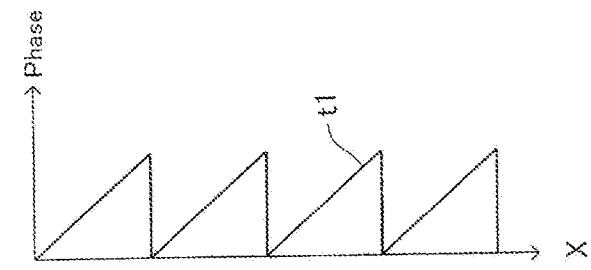
FIGS. 5A to 5E are views each illustrating the phase change in the optical scanning section (phase modulation element) according to another embodiment of the present invention.
Figure 5B:
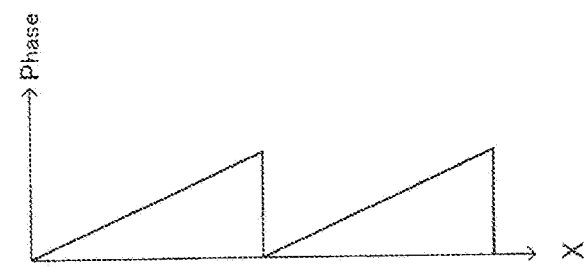
Figure 5C:
Figure 5D:
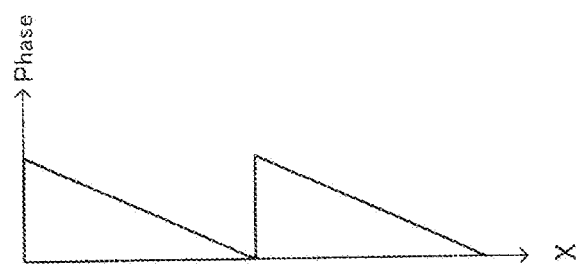
Figure 5E:
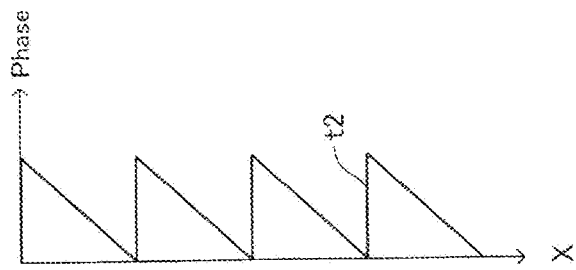

FIGS. 5A to 5E are views illustrating another embodiment of the phase change. In this embodiment, the phase distribution is change into a Kinoform pattern, that is, a pattern in which the phase is repeatedly changed between $0\pi$ to $2\pi$ is changed with time to sequentially change a deflection condition to thereby change a deflection direction as in the case of FIG. 4B. As is the case with FIG. 4B, FIGS. 5A to 5E each represent a phase distribution in correspondence with the configuration of FIG. 4A. FIG. 5A represents a phase state at the time t1, and FIG. 5E represents a phase state at the time t2. By changing with time a phase shape from FIG. 5A to FIG. 5E and vice versa, the coherent light emitted from the light source 11 is deflected. The phase distribution may be set to a Fresnel lens type in which the phase range is a set to a range other than from $0\pi$ to $2\pi$.

Unlike the above-described variable diffraction element is used for the optical scanning section 15, zero-order light is not generated when the phase modulation element is used for the optical scanning section 15, light utilization efficiency can be enhanced. Moreover, as illustrated, the coherent light can be made to enter the incident surface of the optical scanning section 15 at right angles.

According to the present embodiment, there can be provided an illumination device that can make speckle noise less noticeable and a projection type image display device that can present an image in which the speckles noise is less noticeable by illuminating the optical modulation element 31 using the illumination device. Particularly, in the present embodiment, the light scanned by the light scanning section 15 and passed through the optical path conversion system 21 is used for illumination, so that light utilization efficiency can be enhanced.

The present invention is not limited to the above embodiments, and an embodiment obtained by appropriately combining technical features disclosed in each of the above embodiments is included in the technical scope of the present invention.

EXPLANATION OF REFERENCE SYMBOLS

10: Projection type image display device
11: Light source
15: Optical scanning section
151: Liquid crystal
152: Liquid crystal layer
152a: Pixel electrode
152b: Common electrode
153, 154: Transparent base material
21: Optical path conversion system
21a: First light collection element
21b: Second light collection element

The invention claimed is:

1. A projection type image display device comprising:
a light source that emits coherent light;
an optical scanning section that scans the coherent light emitted from the light source;
an optical modulation element having an image formation area in which an image is formed;
an optical path conversion system configured to allow the coherent light scanned by the optical scanning section to illuminate the image formation area sequentially in an overlapping manner; and
a projection optical system that projects the image of the optical modulation element on a screen, wherein
the optical path conversion system includes a first light collection element and a second light collection element, the optical scanning section is provided at an upstream side focal position of the first light collection element, an upstream side focal position of the second light collection element is provided at a downstream side focal position of the first light collection element, the area to be illuminated is positioned at a downstream side focal position of the second light collection element, and an incident angle of the coherent light that enters respective points of the image formation area temporally changes.

2. The projection type image display device according to claim 1, wherein the optical path conversion system illuminates the entire area to be illuminated regardless of a position at which the optical scanning section scans the coherent light.

3. The projection type image display device according to claim 1, wherein the optical scanning section includes a galvano mirror.

4. The projection type image display device according to claim 1, wherein the optical scanning section includes a polygon mirror.

5. The projection type image display device according to claim 1, wherein the optical scanning section includes a variable diffraction element.

6. The projection type image display device according to claim 1, wherein the optical scanning section includes a phase modulation element.

7. The projection type image display device according to claim 1, wherein a beam forming means is disposed between the light source and optical scanning section.

\* \* \* \* \*